July 1, 1930. G. O. DOUGHERTY 1,768,582
SELF CUSHIONING VALVE
Filed July 18, 1927
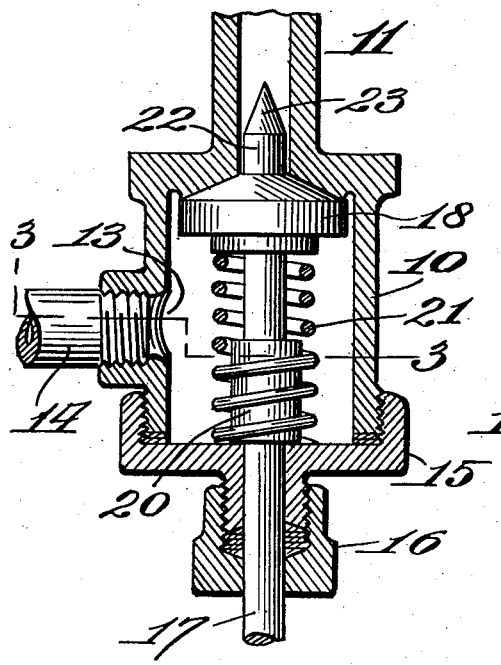
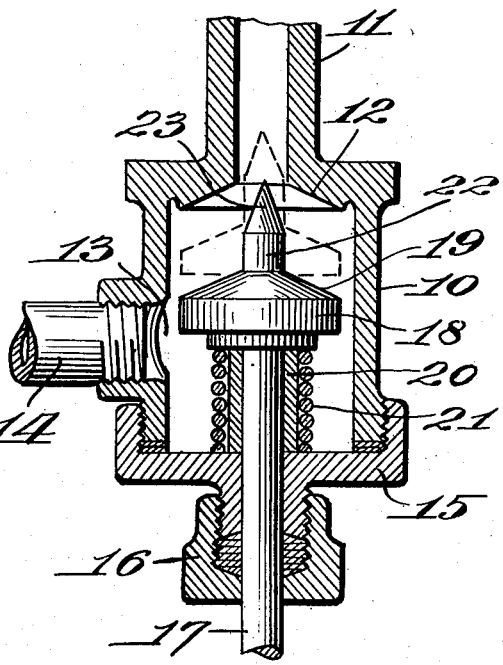
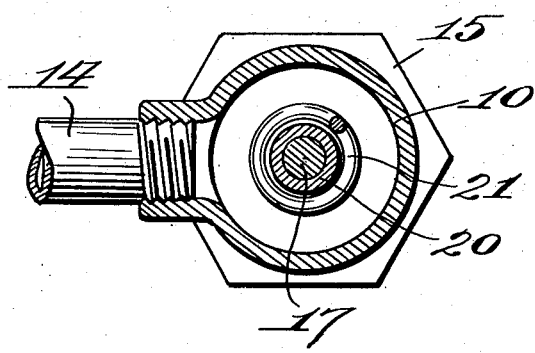
INVENTOR:
GLENN O. DOUGERTY.
By Martin P. Smith, Atty.

Patented July 1, 1930

1,768,582

UNITED STATES PATENT OFFICE

GLENN O. DOUGHERTY, OF LOS ANGELES, CALIFORNIA

SELF-CUSHIONING VALVE

Application filed July 18, 1927. Serial No. 206,511.

My invention relates generally to valves, and more particularly to a self-cushioning valve, and my present invention is an improvement on the valve that forms a part of the pedal actuated faucet covered by U. S. Letters Patent No. 1,627,020, issued to me May 3, 1927.

The principal objects of my invention are, to generally improve upon and simplify the construction of the existing forms of valves that are utilized for controlling the flow of liquids, fluids, and gases, to provide a device of the character referred to wherein the valve proper is positively cushioned as it moves onto its seat to close the passageway through the valve housing, thereby eliminating pounding, chattering and consequent noise as the valve closes; further, to provide a valve that is retained upon its seat by the fluid pressure within the valve housing behind the valve together with the pressure of a spring arranged behind said valve, and, further, to provide a valve structure wherein the valve proper is provided on its forward face with a projecting member, a portion of which is preferably tapered or cone shaped and which projecting member during closing movement cooperates with a portion of the valve housing and the outlet duct therefrom, in gradually cutting off the flow of water from the housing, which action exerts a cushioning effect upon the valve as the same approaches and engages upon its seat.

With the foregoing and other objects in view, my invention consists in certain novel features of construction and arrangement of parts, that will hereinafter be more fully described and claimed and illustrated in the accompanying drawing, in which—

Fig. 1 is a vertical section taken through the center of a valve of my improved construction, said valve being closed.

Fig. 2 is a section similar to Fig. 1 with the valve in full open position.

Fig. 3 is a horizontal section taken on the line 3—3 of Fig. 1.

Referring by numerals to the accompanying drawings which illustrate a practical embodiment of my invention, 10 designates a valve housing which may be of any size and shape, and leading from one end of said housing is a tubular outlet 11, and formed within the housing, around said outlet, is an inclined or beveled valve seat 12.

Formed in the lower portion of the housing, preferably in the side wall thereof, is an inlet opening 13, and connected to the housing, communicating with this inlet opening is a conduit, preferably a tube 14.

The lower end of housing 10, or the end opposite the outlet 11, is closed by a screw cap 15, the same being suitably packed and the central portion of said cap being provided with a suitable gland or stuffing-box 16.

Arranged for reciprocating movement through the gland or stuffing-box 16, and through the center of cap 15, is a rod 17 that functions as a valve stem, and carried by said rod or stem within the chamber in housing 10, is a valve 18 preferably a disc, having a beveled or inclined face 19, that is adapted, when the valve is closed, to rest on seat 12.

A sleeve 20 is arranged on the rod or stem 17 beneath valve 18, said sleeve serving as a stop to eliminate the movement of the valve away from its seat 12, and surrounding this sleeve 20 and interposed between the rear or inside of valve 18 and the cap 15 is an expansive coil spring 21, which normally exerts pressure to force the valve onto its seat.

Formed integral with the front or upper face of valve 18 is a short axially arranged stem 22, the upper or forward end of which is cone shaped as designated by 23. The diameter of stem 22 is slightly less than the diameter of the opening through tubular outlet 11, and when valve 18 is positioned upon its seat so as to cut off the passage of fluid or liquid pressure through the valve housing said stem 22 and its conical forward end project into the outlet passageway through tubular member 11 in order to achieve the desired results and particularly the cushioning of the valve 18 during its closing movement, the body of the stem 22 or that portion between the valve body 18 and the tapered end portion 23 should have uniform diameter throughout its length and the circumferential surface of the body of the stem should lie parallel with the inner surface of the outlet opening through tubular member 11.

Under normal conditions or while the valve is closed the disc 18 is retained on its seat by the pressure of the liquid or fluid within the valve chamber below the valve and also by the pressure exerted by spring 21.

To open the valve, rod 17 is drawn downward or outward, and following the initial movement of the valve 18 away from its seat a relatively small quantity of liquid or fluid will pass around said valve between the inclined or beveled surfaces 12 and 19, and thence upward through the annular space between the stem 22 and the wall around the outlet opening, and this action relieves the pressure within the valve chamber and permits the valve 18 to be drawn away from its seat with comparatively little effort.

In other words, after the initial opening movement has been imparted to the valve its further opening movement may be readily accomplished due to the fact that the pressure throughout the valve chamber is equalized.

During the opening movement of the valve 18, spring 21 will be compressed and the stroke or travel of the valve in its opening movement is limited by sleeve 20 which functions as a stop.

When the valve has been moved into full open position the point of the conical portion 23 of stem 22 will occupy a position at the end of the outlet opening through tubular member 11, as shown by solid lines in Fig. 2, thus entirely opening the outlet passageway, and as a result the liquid or fluid that passes through the valve housing will have a practically unobstructed flow.

When the valve is permitted to close the disc 18 will move upwardly or forwardly onto its seat 12 under the influence of spring 21, and as a result of the pressure exerted by the liquid or fluid passing from inlet opening 13 to the outlet 11, and as the conical end 23 of stem 22 enters and moves into and through the outlet opening immediately adjacent to the seat 12 the effective area of said outlet opening is gradually decreased, thereby retarding the closing movement of the valve and simultaneously with this retarding action the body of the valve 18 will be cushioned against the liquid or fluid that is passing from the valve housing through the outlet and the flow of which liquid or fluid is being gradually retarded as described.

This retarding and cushioning effect increases as the cylindrical portion of the stem 22 enters the outlet opening, for when such condition exists there will be a relatively small flow of liquid or fluid through the annular space surrounding said stem 22 and the valve will move onto its seat without pounding or chattering, which results are very desirable in devices of the character to which my invention relates.

The spring 21 associated with my improved valve insures positive closing movement to the valve even where the latter is utilized for controlling the flow of low pressure liquids, gases, or the like.

Valves of my improved construction may be used singly or in multiple, and their simplicity of construction and operation renders them particularly efficient in controlling the flow of all mobile substances such as liquids and gases, and particularly liquids and gases that are under pressure.

The spring behind the valve and the pressure of the liquid or gas flowing through the valve housing cooperates to render the valve positive in its closing action, and the throttling of the flow of liquid or fluids through the valve, and particularly at the point where the fluids leave the valve housing, exerts a cushioning effect on the valve so as to entirely eliminate the objectionable noises incident to the pounding and chattering of valves that engage in their seats at the termination of a quick or sudden movement.

A self-cushioning valve of my improved construction is comparatively simple, comprises but two moving parts, is inexpensive of manufacture, and is very effective in performing the functions for which it is intended.

It will readily be understood that minor changes in the size, form and construction of the various parts of my improved self-cushioning valve may be made and substituted for those herein shown and described without departing from the spirit of my invention, the scope of which is set forth in the appended claims.

I claim as my invention—

1. In a self-cushioning valve, a housing provided with inlet and outlet openings, a valve seat formed in the housing between said openings, a valve adapted to engage on said seat, a stem carried by said valve, which stem projects into the outlet from said valve housing, a spring cooperating with said valve for pressing the same onto its seat, and a sleeve loosely arranged on the valve stem to the rear of the valve and within said spring for limiting the opening movement of said valve.

2. In a self-cushioning valve a valve housing having inlet and outlet openings, a valve seat formed within the housing around the outlet opening therefrom, a valve adapted to engage on said seat a stem projecting from said valve into said outlet opening, the diameter of which stem is slightly less than the diameter of said outlet opening the peripheral surface of which stem has the same diameter throughout its length and arranged so as to occupy a position parallel with the inner surface of the opening into which said stem projects and the terminal portion of which projecting stem is conical in form.

3. In a self-cushioning valve a housing having inlet and outlet openings, a seat formed within said housing around the outlet opening therefrom, a spring held valve normally resting upon said seat, an axial stem formed integral with and projecting from said valve into the outlet opening, the diameter of the main body of which stem is slightly less than the diameter of said outlet opening and arranged so as to occupy a concentric position within the outlet opening into which the body of the stem projects, and the forward portion of which stem is tapered.

4. In a self-cushioning valve, a housing provided with inlet and outlet openings, a valve seat formed within said housing adjacent to the outlet opening, a stem upon which said valve is carried, an expansive coil spring arranged beneath said valve, a sleeve arranged on the valve stem beneath said valve and within said spring for limiting the opening movement of the valve, a portion of which valve stem projects beyond the valve, said projecting portion having a diameter slightly less than the diameter of the outlet opening from the housing and the end of the projecting portion of said valve stem being tapered.

In testimony whereof I affix my signature.

GLENN O. DOUGHERTY.